United States Patent [19]

Nose et al.

[11] Patent Number: 4,998,016
[45] Date of Patent: Mar. 5, 1991

[54] PROBE UNIT, DRIVING METHOD THEREOF, AND SCANNING DEVICE FOR DETECTING TUNNEL CURRENT HAVING SAID PROBE UNIT

[75] Inventors: Hiroyasu Nose, Zama; Osamu Takamatsu, Atsugi; Toshihiko Miyazaki, Hiratsuka; Toshimitsu Kawase, Atsugi, all of Japan

[73] Assignee: Canon Kabushiki Kaisha, Tokyo, Japan

[21] Appl. No.: 544,014

[22] Filed: Jun. 28, 1990

Related U.S. Application Data

[63] Continuation of Ser. No. 431,906, Nov. 6, 1989, abandoned.

[30] Foreign Application Priority Data

Nov. 9, 1988 [JP] Japan .................................. 63-282783
Oct. 19, 1989 [JP] Japan .................................. 1-273041

[51] Int. Cl.$^5$ .............................................. H01J 37/26
[52] U.S. Cl. .................................... 250/306; 250/307; 369/101; 369/126; 346/158

[58] Field of Search ............... 250/306, 307; 369/101, 369/126; 346/158

[56] References Cited

U.S. PATENT DOCUMENTS 4,668,865 5/1987 Gimzewski et al. ................. 250/306
4,894,538 1/1990 Iwatsuki et al. ..................... 250/306

FOREIGN PATENT DOCUMENTS 0305033 3/1989 European Pat. Off. ........... 369/126

Primary Examiner—Jack I. Berman
Attorney, Agent, or Firm—Fitzpatrick, Cella, Harper & Scinto

[57] ABSTRACT

A probe unit comprises a substrate, a first electrode formed on the substrate, a bridge-shaped flexible member formed on the substrate and insulated by a cavity from the first electrode, and a probe provided in contact with the flexible member. The flexible member is constituted of a laminate comprising a second electrode layer, an insulating layer, and a third electrode layer for applying a voltage to the probe. The first electrode may be included in the flexible member. A piezoelectric layer is between the first electrode and the second electrode.

41 Claims, 8 Drawing Sheets

PROBE UNIT, DRIVING METHOD THEREOF, AND SCANNING DEVICE FOR DETECTING TUNNEL CURRENT HAVING SAID PROBE UNIT

This application is a continuation of application Ser. No. 431,906 filed Nov. 6, 1989, abandoned.

BACKGROUND OF THE INVENTION

1. Field of the Invention

The present invention relates to a probe unit for a scanning type of tunnel current detecting device for, for example, a scanning tunnel microscope and a high-density recording-reproducing apparatus utilizing the principle of the microscope.

The present invention relates also to a method for driving a probe suitable for the probe unit.

The present invention further relates to a scanning-type tunnel current detecting device provided with the probe unit.

2. Related Background Art

A scanning tunnel microscope (hereinafter referred to as STM) is already known which utilizes the tunnel effect in which electric current flows through a barrier between the surface of a specimen and a sharp electro-conductive probe brought as close as several nm or less to the surface. [See G. Binnig et al., Helvetica Physica Acta, 55, 726 (1982); U.S. Pat. No. 4,343,993, etc.]

The tunnel current which flows on application of a voltage between a probe and the surface of a specimen brought to close proximity of several nm or less will change exponentially as a function of the distance therebetween. Accordingly, the surface of the specimen can be observed at high resolution in an atomic level by scanning the surface of the specimen in X and Y directions in matrix with the probe with the tunnel current kept constant.

A high-density recording-reproducing apparatus which is based on the principle of the STM is described in Japanese Patent Application Laid-Open Nos. 63-161552 and 63-161553. In such an apparatus, recording is conducted, with a probe similar to that of STM, by changing the voltage applied between the probe and a recording medium which exhibits memory effect in its switching characteristics. The material for the recording medium is exemplified by a thin layer of a chalcogen compound or of an organic compound having a $\pi$-electron system. The reproduction is conducted according to the difference in tunnel resistance between the recorded portion and the nonrecorded portion of the thin layer. In this type of recording, recording-reproducing is practicable by use of a recording medium the surface shape of which can be changed by application of a voltage to the probe.

Japanese Patent Application Laid-Open No. 61-206148 (1986) describes a probe formed by utilizing a processing technique [K. E. Peterson "Silicon as a Mechanical Material", Proceedings of the IEEE, 70 (5), 420–457 (1982)] for providing a minute structure on a substrate, and also describes an STM based on such a technique. This probe unit is constructed of a silicon single crystal as a substrate, a parallel spring made by fine fabrication and being finely movable in X-Y directions, and a tongue-shaped member having a probe provided on the movable portion so that the probe may be displaced in the direction perpendicular to the substrate face (in the Z direction) by electrostatic force caused by an applied electric field between the tongue-shaped part and the bottom face portion.

Japanese Patent Application Laid-Open No. 62-281138 describes a memory device provided with a converter array in which tongue-shaped parts as disclosed in Japanese Patent Application Laid-Open No. 61-206148 are arranged in a multiple manner.

In conventional probe units of a cantilever structure, there are posed, for example, the following disadvantages (1) to (4).

(1) The probe, since it is provided on the tip end of the cantilever, tends to positionally deviate slightly by thermal expansion or contraction of the cantilever in the length direction, or by deformation caused by difference in thermal expansion coefficient between the cantilever material and the electrode material.

(2) A cantilever constituting a probe is difficult to from precisely because of liability of causing warpage or torsion by the internal stress in preparation thereof. The cantilever is also liable to be deformed by internal stress relaxation with a lapse of time. Accordingly, a cantilever is unsatisfactory for a probe-driving mechanism which is required to have position-controllability with precision of an atomic level. A multiple arrangement of cantilevers, for example, as shown in the above-mentioned Japanese Patent Application Laid-Open No. 62-281138, required to maintain the mutual positional relation with high precision. The cantilever, however, could not satisfy such requirement.

(3) In the aforementioned prior art, the substrate is prepared by finely processing a silicon single crystal, and the material for the substrate is limited to silicon, which needs many steps of production processing, resulting in a disadvantageously high cost.

(4) Further in the prior art, the driving mechanism has a plurality of probes on parallel hinges. Therefore, on driving each of the probes in the z direction, each probe may be deviated by electrostatic force, causing mutual interference of the probes, if the parallel hinges are not sufficiently rigid.

SUMMARY OF THE INVENTION

An object of the present invention is to provide a probe unit which overcomes the above-mentioned disadvantages of the prior art, and which is affected little by the temperature change in the operation, and which allows a precise positional control at an atomic level when the probes are arranged in a multiple manner.

Another object of the present invention is to provide a probe unit which can be prepared with high precision without occurrence of warpage and torsion in production.

A further object of the present invention is to provide a method for driving such a probe.

A still further object of the present invention is to provide a scanning type of tunnel current detecting device which is compact, operable by a low voltage, affected little by external vibration, and capable of stable scanning.

These objects are achieved by the present invention described below.

According to an aspect of the present invention, there is provided a probe unit comprising a substrate, a bridge-shaped flexible member formed on the substrate, and a probe provided in contact with the flexible member, the probe unit further comprising a driving means for displacing the probe in a direction perpendicular to a face of the substrate.

According to another aspect of the present invention, there is provided a probe unit comprising a substrate, a first electrode formed on the substrate, a bridge-shaped flexible member formed on the substrate and insulated by a cavity from the first electrode, and a probe provided in contact with the flexible member, the flexible member being constituted of a laminate comprising a second electrode layer, an insulating layer, and a third electrode layer for applying a voltage to the probe.

According to still another aspect of the present invention, there is provided a probe unit comprising a substrate, a first electrode formed on the substrate, a piezoelectric layer formed on the first electrode, a bridge-shaped flexible part formed on the substrate, and a probe provided in contact with the flexible member, the flexible member being constituted of a laminate comprising a second electrode layer, an insulating layer, and a third electrode layer for applying a voltage to the probe, and the first electrode and the second electrode layer being in opposition to each other with interposition of the piezoelectric layer.

According to a further object of the present invention, there is provided a probe unit comprising a substrate, a bridge-shaped flexible member formed on the substrate, and a probe provided in contact with the flexible member, the flexible member being constituted of a laminate comprising a beam structure layer, a first electrode, a piezoelectric layer, a second electrode layer, an insulating layer, and a third electrode layer for applying a voltage to the probe.

According to a still further aspect of the present invention, there is provided a method for driving a probe unit comprising a substrate, a first electrode formed on the substrate, a bridge-shaped flexible member formed on the substrate and insulated by a cavity from the first electrode, and a probe provided in contact with the flexible member, the flexible part being constituted of a laminate comprising a second electrode layer, an insulating layer, and a third electrode layer for applying a voltage to the probe; the method comprising displacing the probe in a direction perpendicular to the substrate face by an electrostatic force caused by application of voltage between the first electrode and the second electrode layer.

According to a still further aspect of the present invention, there is provided a method for driving a probe unit comprising a substrate, a first electrode formed on the substrate, a piezoelectric layer formed on the first electrode, a bridge-shaped flexible member formed on the substrate, and a probe provided in contact with the flexible member, the flexible member being constituted of a laminate comprising a second electrode layer, an insulating layer, and a third electrode layer for applying a voltage to the probe, and the first electrode and the second electrode being in opposition to each other with interposition of the piezoelectric layer; the method comprising displacing the probe in a direction perpendicular to the substrate face by means of a piezoelectric effect caused by application of voltage between the first electrode and the second electrode layer.

According to a still further aspect of the present invention, there is provided a method for driving a probe unit comprising a substrate, a bridge-shaped flexible member formed on the substrate, and a probe provided in contact with the flexible member, said flexible member being constituted of a laminate comprising a beam structure layer, a first electrode layer, a piezoelectric layer, a second electrode layer, an insulating layer, and a third electrode layer for applying a voltage to the probe; the method comprising displacing the probe in a direction perpendicular to the substrate face by means of a piezoelectric effect caused by application of voltage between the first electrode layer and the second electrode layer.

According to a still further aspect of the present invention, there is provided a scanning type of tunnel current detecting device having a probe unit comprising a substrate, a bridge-shaped flexible member provided on the substrate, a probe provided on the flexible member, and a driving means for displacing the probe relative to the substrate; an adjusting means for adjusting the distance between the probe and a specimen to be observed; and a voltage applying means for applying a voltage between the probe and the specimen.

According to a still further aspect of the present invention, there is provided a scanning tunnel microscope having a probe unit comprising a substrate, a bridge-shaped flexible member provided on the substrate, a probe provided on the flexible member, and a driving means for displacing the probe relative to the substrate; an adjusting means for adjusting the distance between the probe and a specimen to be observed; and a voltage applying means for applying a voltage between the probe and the specimen.

According to a still further aspect of the present invention, there is provided a recording-reproducing device having, a probe unit comprising a substrate, a bridge-shaped flexible member provided on the substrate, a probe provided on the flexible member, and a driving means for displacing the probe relative to the substrate; a recording medium; an adjusting means for adjusting the distance between the probe and the recording medium; and a voltage applying means for applying a voltage between the probe and the recording medium.

According to a still further aspect of the present invention, there is provided a recording method employing a probe unit comprising a substrate, a bridge-shaped flexible member provided on the substrate, a probe provided on the flexible member, and a driving means for displacing the probe relative to the substrate; the method comprising allowing said probe to come close to a recording medium, and applying a pulse voltage between said probe and said recording medium.

According to a still further aspect of the present invention, there is provided a recording-reproducing method employing a probe unit comprising a substrate, a bridge-shaped flexible member provided on the substrate, a probe provided on the flexible member, and a driving means for displacing the probe relative to the substrate, said method comprising allowing said probe to come close to a recording medium, applying a pulse voltage between said probe and said recording medium to perform recording, and applying a bias voltage therebetween to reproduce the record.

According to a still further aspect of the present invention, there is provided a recording-reproducing-eliminating method employing a probe unit comprising a substrate, a bridge-shaped flexible member provided on the substrate, a probe provided on the flexible member, and a driving means for displacing the probe relative to the substrate, said method comprising allowing said probe to come close to a recording medium and applying a first pulse voltage between said probe and said recording medium to perform recording, applying a bias voltage therebetween to reproduce the record, and applying a second pulse voltage therebetween to eliminate the record.

DETAILED DESCRIPTION OF THE PREFERRED EMBODIMENTS

The bridge-shaped flexible member in the present invention has a structure of a both-ends-fixed beam in which the both ends of the flexible member are fixed on a substrate.

The flexible member is specifically constituted of a laminate comprising at least an electrode layer, an insulating layer, another electrode layer for applying a voltage to the probe, the laminate being connected to the substrate by at least two supports. The shape of the flexible member is not limited.

Scanning of the probe can be performed under less influence from external vibration by raising the natural vibration frequency of the flexible member because the probe is formed on the flexible member provided on the substrate.

The probe unit having the structure of the present invention will not cause warpage nor torsion of the flexible member in the production of the probe unit because the probe unit is produced by laminating an electrode layer, an insulating layer, and another electrode layer for application of voltage to the probe and then processing and etching means of a photolithography technique.

The driving means suitable for the probe unit of the present invention include those employing electrostatic force, and those employing the piezoelectric effect, among which those employing a piezoelectric effect are preferable for a larger stroke of the probe.

The probe units and the methods of driving the units are described in detail by referring to the following Embodiments 1 to 4.

Embodiment 1

Figure 1:
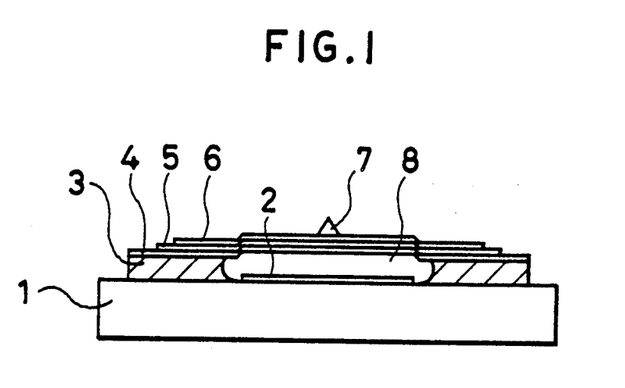
FIG. 1 illustrates a cross-section of the first embodiment of the probe unit of the present invention.
Figure 2:
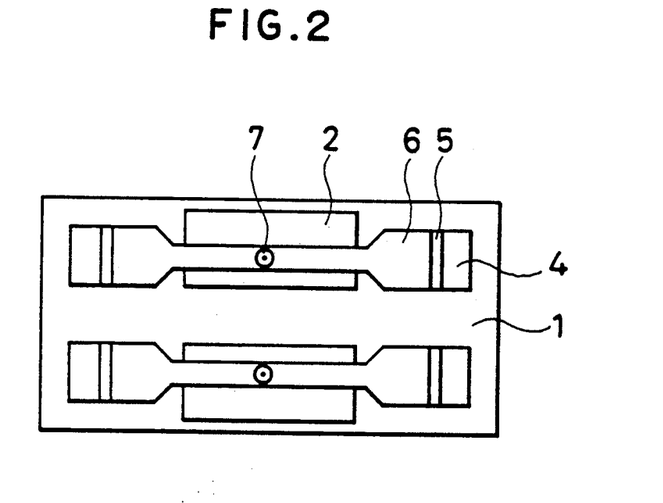
FIG. 2 illustrates a plan view of the first embodiment of the probe unit of the present invention.

An embodiment of the present invention is explained with reference to the figures. FIG. 1 and FIG. 2 are a cross-sectional view and a plan view for explaining a probe unit of the present invention. On a substrate 1, a lower electrode 2 is provided. A support 3 is etched on and around the lower electrode 2 to form a cavity 8, and an upper electrode 4, an insulating film 5, and a probe electrode 6 are formed in the shape of a bridge. Further, on the probe electrode, a probe 7 is provided which serves to detect electric current generated by a tunnel effect. The probe is placed so as to keep equal its distance from the sides of the support 3 of the bridge. The force driving the probe 7 in a direction perpendicular to the substrate face is an electrostatic force, which causes displacement of the probe by application of a voltage to the lower electrode 2 and the upper electrode 4. The probe displacement mechanism is constituted of a both-ends-supported beam, allowing displacement strictly perpendicular to the substrate face.

The insulating film 5 serves to insulate the probe 7, detecting generated tunnel current and the probe electrode 6 (electrically connected to the probe 7) from the upper electrode 4.

For example, in the case where the bridge has a length of 200 $\mu$m, a breadth of 20 $\mu$m, and a thickness of approximately 1 $\mu$m, and the distance between the electrodes is 3 $\mu$m, the application of 50 V between the lower and the upper electrodes causes a displacement of approximately 1 $\mu$m in the direction perpenducular to the substrate face (in a Z axis direction). Additionally, this structure gives a resonance frequency of as high as 200 KHz of the flexible member, enabling scanning with less influence of external vibration.

The probe unit of this structure is driven specifically as described below.

Several tens of volts of an offset voltage is initially applied between the electrodes. The reduction of the voltage restores the probe on the bridge-shaped, both-ends-supported beam to pull out the probe in a Z direction owing to its elasticity, while the increase of the voltage strengthen further the attracting force to pull in the probe in the Z axis direction, whereby the driving is feasible in the Z direction.

The steps of forming the probe unit of FIG. 1 and FIG. 2 are described by referring to FIGS. 3A–3D.

Step A

Figure 3A:
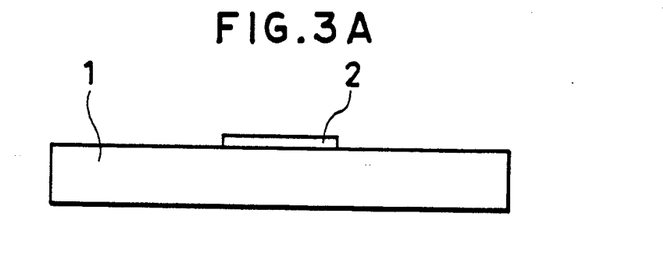
FIG. 3A through FIG. 3D illustrate the steps of forming the probe unit of FIG. 1 and FIG. 2.

A glass plate made of glass 7059 supplied by Corning Co. having a thickness of 1.1 mm was employed as the substrate 1. Thereon chromium was deposited in a thickness of 0.1 $\mu$m by vacuum vapor deposition, and processed by photolithography to form the lower electrode 2.

Step B

Figure 3B:
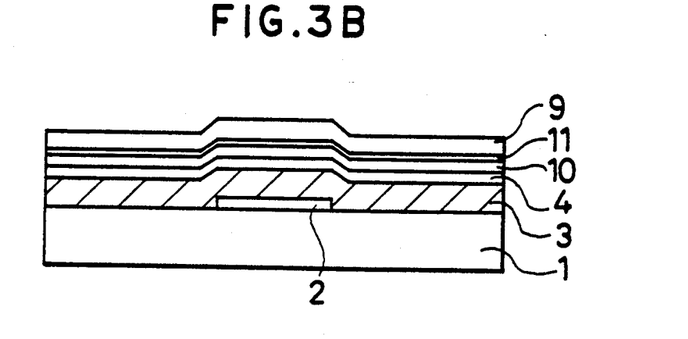

Subsequently, copper as the supporter 3, titanium as the upper electrode 4, a silicon oxide film as the insulating film 10, titanium as the probe electrode 11, and tungsten as the probe material 9 were deposited thereon by a successive sputtering method in thicknesses of 3.0 $\mu$m of copper, 0.2 $\mu$m of titanium, 0.6 $\mu$m of silicon oxide, 0.2 $\mu$m of titanium, and 3.0 $\mu$m of tungsten.

Step C

Figure 3C:
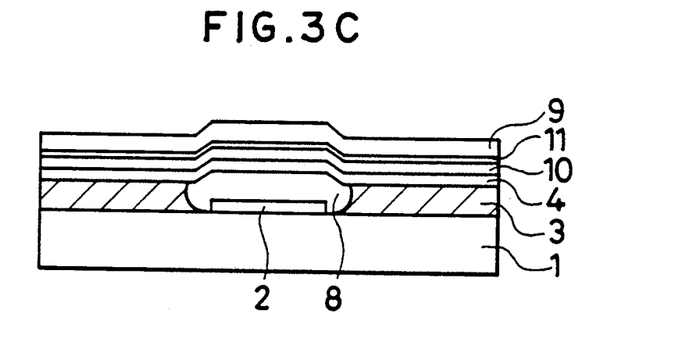

The successively formed five-layered film prepared in the Step B was processed consecutively by etching with a hydrofluoric acid type etching solution to give a pattern of the upper electrode 4 in FIG. 2. Then by means of photolithography, the portion except above the lower electrode 2 was covered with a photoresist, and copper of the support 3 was over-etched with a hydrochloric acid type etching solution to form the cavity 8.

In this embodiment, the etching pattern or the over-etching state should be controlled in such a manner that the support which is made of copper is insulated from the lower electrode 2. In the case where the support is of insulative material, such control is not needed.

Figure 3D:
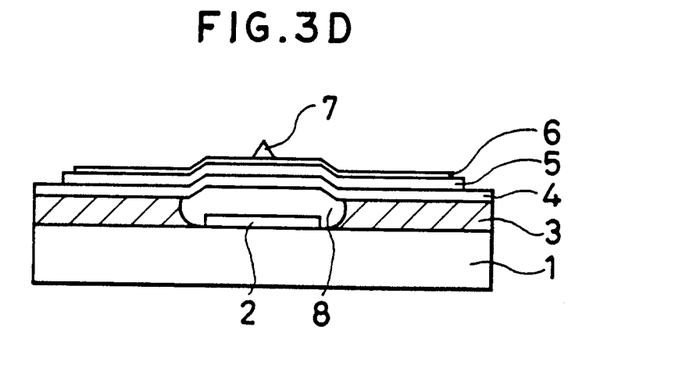

Thereafter the probe electrode 11 was processed to give a pattern 6 in FIG. 2 by means of photolithography. Then the insulating film 10 was fabricated to give a pattern denoted by the numeral 5 in FIG. 2 by photolithography. Further the probe material 9 was over-etched with a sodium hydroxide-red prussiate type etching solution to form a probe 7 of tungsten. Thus the probe unit was prepared.

Since the probe unit described above is formed by employing a photolithography technique and a vacuum film-formation technique, the substrate employed may be of a low-priced material, and the unit can be mass-produced. The means for applying a voltage between the upper electrode and the lower electrode provides a mechanism for displacement in the Z direction for each probe, thus enabling individual adjustment of the surface unevenness and the surface height deviation arising in the probe formation. This probe unit is advantageous also in that the probe is capable of moving in the completely perpendicular direction, and exhibits extremely high resonance frequency.

Embodiment 2

Figure 4:
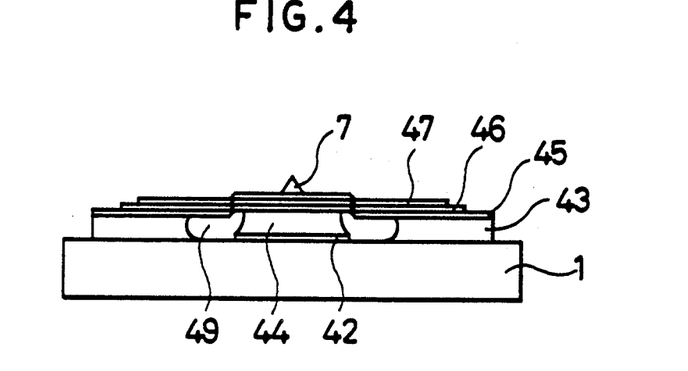
FIG. 4 illustrate the cross-section of the second embodiment of the probe unit of the present invention.
Figure 5:
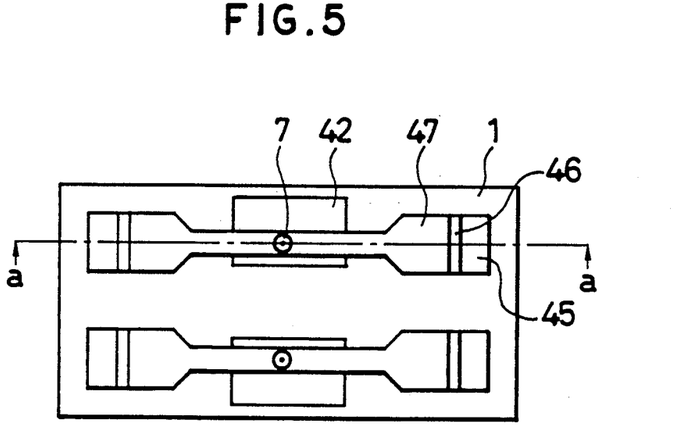
FIG. 5 illustrates a plan view of the second embodiment of the probe unit of the present invention.

A second embodiment is described below. FIG. 4 and FIG. 5 are a cross-sectional view and a plan view respectively for explaining a probe unit of the present invention. On a substrate 1, a support 43 is provided. The support 43 has a cavity 49. A lower electrode 42 and a piezoelectric layer 44 are provided in the cavity and brought into contact with the substrate 1. Further, on the support 43 and the piezoelectric layer 44, an upper electrode 45, an insulating film 46, and a probe electrode 47 are formed in the shape of a bridge. On the probe electrode, a probe 7 is provided which serves to detect electric current generated by the tunnel effect. The probe is placed so as to keep its distances from the sides of the support of the bridge equal. The probe 7 is driven in a direction perpendicular to the substrate face by applying a voltage between the upper electrode 45 and the lower electrode 42 to deform the piezoelectric layer 44. The change of the polarity of the upper electrode and the lower electrode enables an up and down displacement of the probe in the Z direction. Additionally, the probe displacement mechanism is constituted of a both-ends-supported beam, allowing displacement strictly perpendicular to the substrate face.

The insulating film 46 is provided to serve to insulate, from the upper electrode 45, the probe 7 and the probe electrode 47 electrically connected with the probe 7.

For example, in the case where the bridge has a length of 200 μm, a breadth of 20 μm, and a thickness of approximately 1 μm, and the piezoelectric layer has a height of 3 μm, the application of 30 V between the lower and the upper electrodes causes a displacement of approximately 1 μm in the Z direction.

The steps of forming the probe unit of FIG. 4 and FIG. 5 is described by referring to FIG. 6A through FIG. 6E. FIG. 6A through FIG. 6E illustrate production steps by a cross-sectional view taken from the line a—a in FIG. 5.

Step A

Figure 6A:
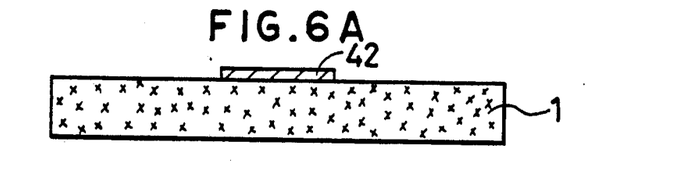
FIG. 6A through FIG. 6E illustrate the steps of forming the probe unit of FIG. 4 and FIG. 5.

A glass plate made from glass 7059 supplied by Corning Co. having a thickness of 1.1 mm was employed as the substrate 1. Thereon chromium was deposited in a thickness of 0.1 μm by vacuum vapor deposition, and processed by means of photolithography to form the lower electrode 42.

Step B

Figure 6B:
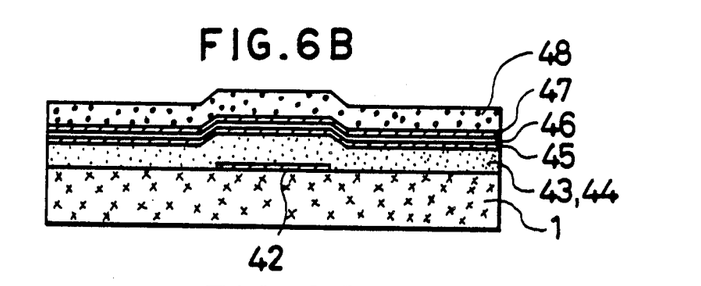

Subsequently, as the support 43, 44, a piezoelectric material, aluminum nitride (A1N) was formed in a film thickness of 3 μm by means of RF magnetron sputtering by using A1N as the target under the conditions of a back pressure of $10^{-7}$ torr, an argon pressure of $5 \times 10^{-3}$ torr (N$_2$: 50%), RF power of 5 W/cm$^2$ and substrate temperature of 350° C.

Thereafter, on the support 43, 44, titanium as the upper electrode 45, a silicon oxide film as the insulating film 46, titanium as the probe electrode 47, and tungsten as the probe material 48 were deposited by means of a successive sputtering method in thicknesses of 0.2 μm of titanium, 0.6 μm of silicon oxide, 0.2 μm of titanium, and 3.0 μm of tungsten.

Steps C and D

Figure 6C:
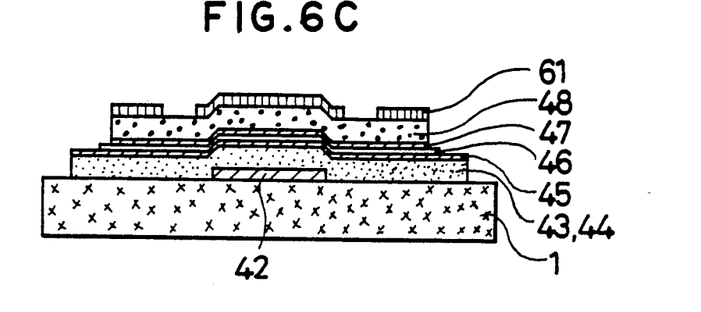
Figure 6D:
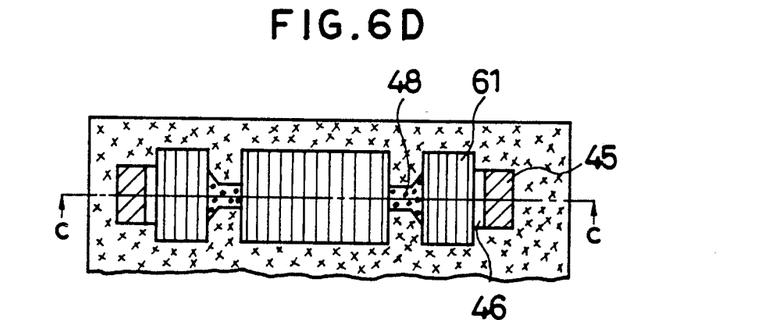

The successively formed five-layered film prepared in the Step B was processed consecutively by etching with a hydrofluoric acid type etching solution to give a pattern of the upper electrode 45 in FIG. 5.

Then by means of photolithography, the probe electrode 47 and the insulating film 46 were processed into a pattern of FIG. 5. The probe material 48 was also processed into a pattern of the probe electrode 47 as shown in FIG. 5. Thereafter in order to provide the cavity 49, a photoresist layer 61 was formed except above the portions corresponding to the cavity 49 which are at both sides of the piezoelectric layer 44 to be kept remaining. (FIG. 6C is a cross-sectional view taken from the line c—c in FIG. 6D)

Step E

Figure 6E:
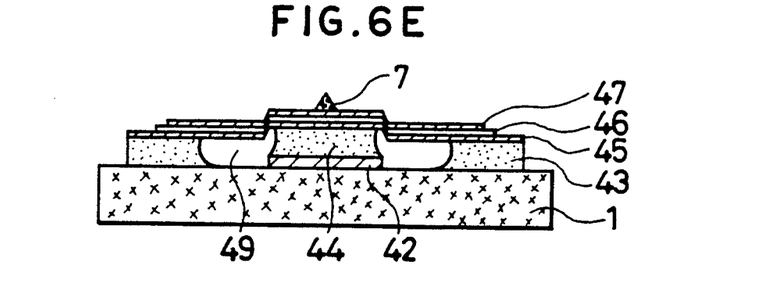

Subsequently, the support and piezoelectric material 43, 44 was over-etched with an aqueous acetic acid-nitric acid solution to form the cavity 49 by means of photolithography. In this Example, the etching of the pattern or the state of the over-etching should be controlled in such a manner that the support 43, 44 which is a piezoelectric material of (A1N) is insulated from the lower electrode 42 and that the cavity in the desired shape is obtained. Finally, the probe material 48 was over-etched with a sodium hydroxide-red prussiate type etching solution to form a tungsten probe 7. Thus the probe unit was obtained.

EMBODIMENT 3

Figure 7A:
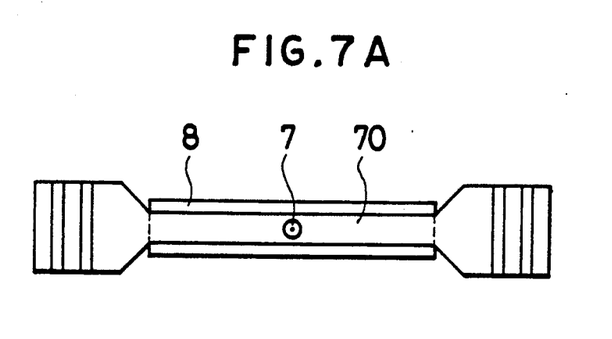
FIG. 7A and FIG. 7B illustrate respectively a cross-sectional view and a plan view of the third embodiment of the probe unit of the present invention.
Figure 7B:
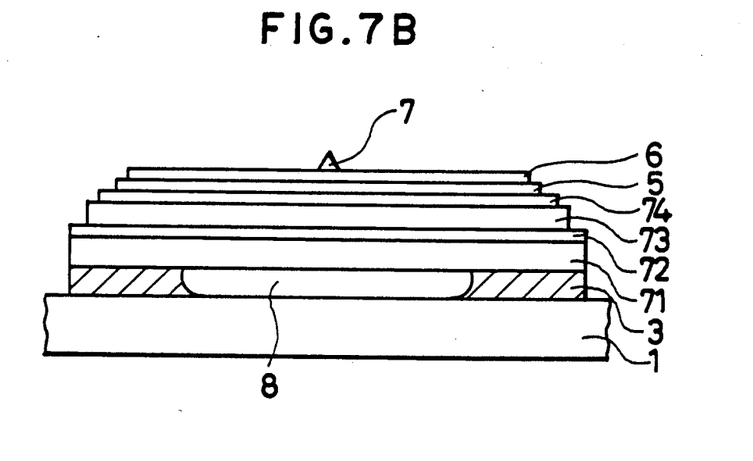
Figure 8:
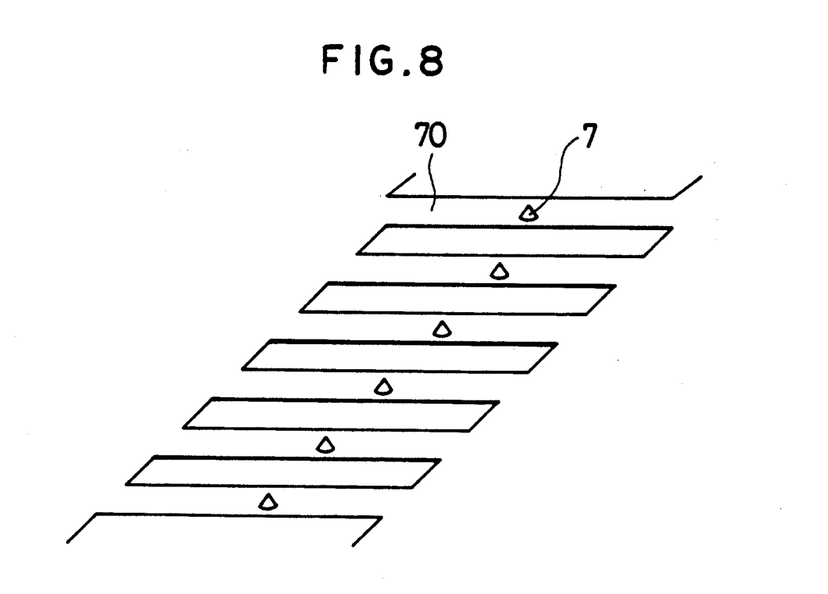
FIG. 8 shows a schematic view an arrangement of a plurality of the probe units.

A third Embodiment of the present invention is described below with reference to FIG. 7A and FIG. 7B. In FIG. 7A and FIG. 7B, the numeral 1 denotes a substrate; 3, a support; 8, a cavity; and the portion on the support constitutes a bridge-shaped both-ends-supported beam 70. The both-end-supported beam 70 is constituted, from the bottom, of a beam structure layer 71, a lower electrode layer 72, a piezoelectric material layer 73, an upper electrode layer 74, an insulating layer 5, an electrode layer 6 for applying a voltage to the probe, and an electroconductive probe 7 through which the tunnel effect current flows. The probe 7 is placed at the central position of the both-ends-supported beam 70.

The driving of probe 7 in the direction perpendicular to the substrate surface (the Z direction) is conducted by utilizing expansion-constriction of the piezoelectric material 73. That is, the application of a voltage to the piezoelectric material 73 which has been treated for polarization, from the lower electrode 72 and the upper electrode 74 expands the both-ends-supported beam lengthwise to cause deflection of the both-ends-supported beam by the difference of the expansion from that of the beam structure layer, thus driving the probe 7.

Figure 9A:
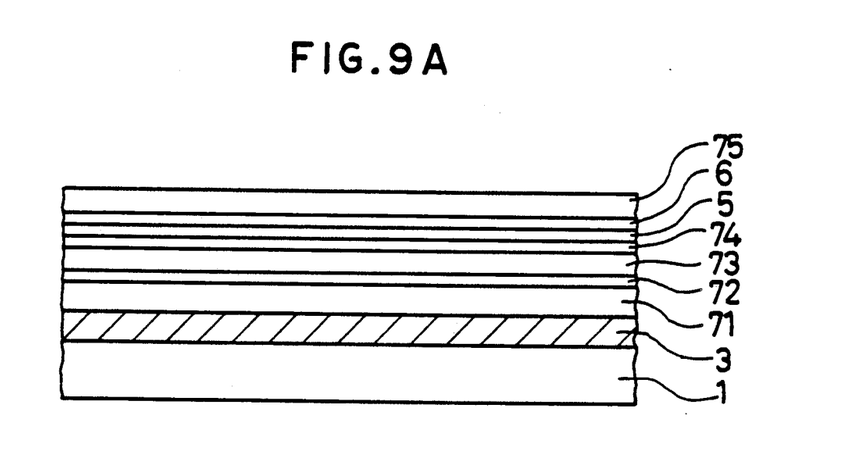
FIG. 9A through FIG. 9C illustrate principle steps of forming the probe unit of FIG. 7.
Figure 9B:
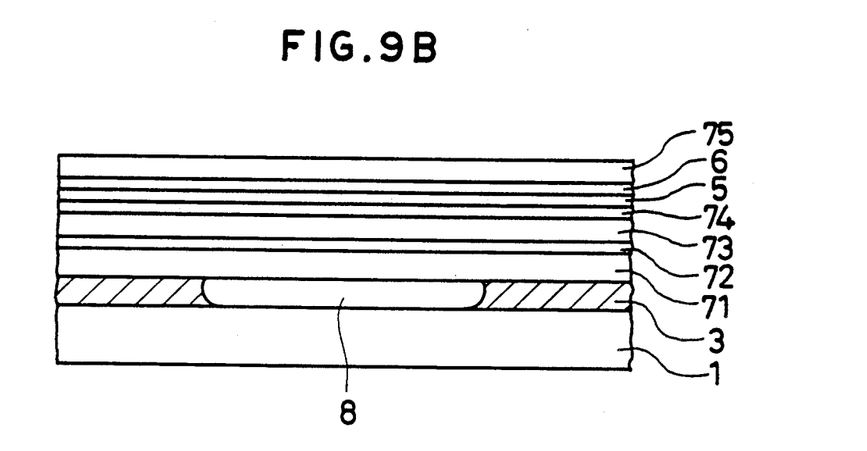
Figure 9C:
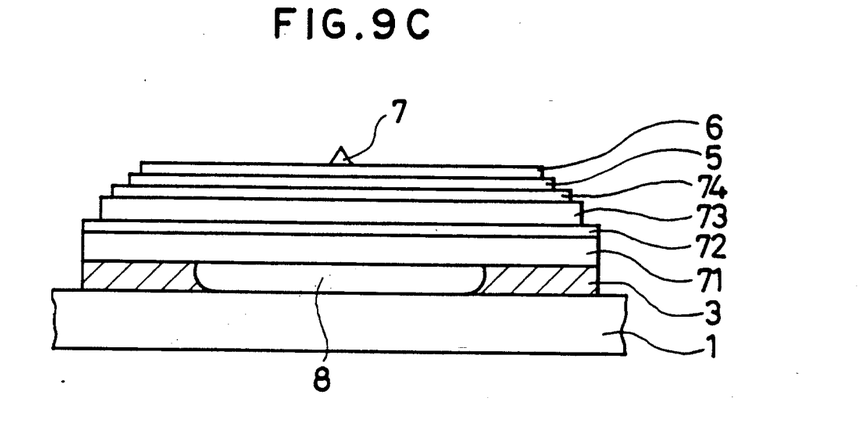

The steps of forming the probe unit illustrated in FIG. 7A and FIG. 7B is described by referring to FIGS. 9A, 9B, and 9C.

Step A

A glass plate of 1 mm thick was employed as the substrate 1. Thereon copper as the support 3, a silicon oxide film as the beam structure layer 71, and titanium as the lower electrode 72 were deposited by a successive sputtering method in thicknesses respectively of 3.0 $\mu$m of copper, 3 $\mu$m of a silicon oxide film, and 0.2 $\mu$m of titanium. Thereon 3 $\mu$m of aluminum nitride was deposited as the piezoelectric material 73 by means of RF magnetron sputtering. Further thereon titanium as the upper electrode 74, a silicon oxide film as the insulating film 5, titanium as the electrode 6 for applying a voltage to the probe, tungsten as the probe material 75 were deposited by successive sputtering in thicknesses respectively of 0.2 $\mu$m of titanium, 0.6 $\mu$m of the silicon oxide film, 0.2 $\mu$m of titanium, and 3.0 $\mu$m of tungsten.

Step B

The four layers from the probe material 75 to the upper electrode 74 out of the successively formed film of the Step A described above was processed by means of photolithography into a pattern shape of the beam structure layer 71 in FIG. 7A by etching the four layers successively with a hydrofluoric acid type etching solution. Subsequently, the piezoelectric material (aluminium nitride) 73 was similarly processed with glacial acetic acid-nitric acid etching solution.

Further the three layers from the lower electrode 72 to the support 3 were successively processed with a hydrofluoric acid type etching solution. Then, by means of photolithography, the portion except above the cavity 8 in FIG. 9A was covered with a photoresist, and over-etched the copper of the support 3 with a hydrochloric acid type etching solution to form the cavity 8.

Step C

Subsequently, according to photolithography, the seven layers from the electrode layer 6 for probe voltage application to the support 3 were processed sequentially to give the patterns shown in FIG. 7A. Then the probe material 75 was over-etched with a sodium hydroxide-red prussiate type etching solution to form the tungsten probe 7.

EMBODIMENT 4

A tunnel current detecting apparatus is explained in which a probe unit of Embodiments 1 to 3 is incorporated.

Figure 10:
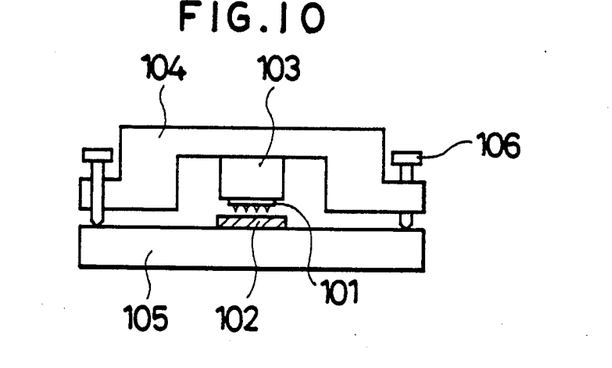
FIG. 10, FIG. 11, and FIG. 12 illustrate constitution of the probe units employed to tunnel current detecting devices.
Figure 11:
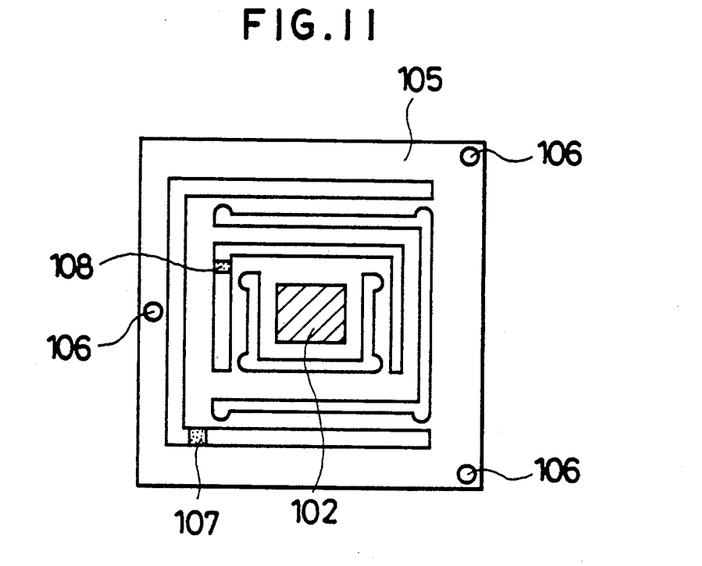

FIG. 10 shows a cross-section of the apparatus. The numeral 101 denotes a probe unit provided with a plurality of the probes of the present invention. The probe unit is fixed to a Z-axis coarse-adjusting piezoelectric element 103 for coarse adjustment in the Z direction to bring the probe unit 101 close to the opposing surface of the specimen 102 so that a tunnel current is detectable. The inclination of the fixing member 104 which fixes the Z-axis coarse-adjusting piezoelectric element 103 is adjustable by three inclination-adjusting screws 106, thereby the degree of parallelization between the probe unit 101 and the surface of the specimen 102 being correctable. The numeral 105 denotes a parallel hinge spring stage which has double parallel springs arranged in rectangular cross as shown in the plan view of FIG. 11, whereby the specimen 102 placed on the center can be moved freely in X-Y directions. The drive of the specimen is performed by piezoelectric elements 107 and 108. Such a constitution allows the probe to scan the surface of the specimen 102 in X-Y directions, thereby keeping constant the distance between the surface and the probe by adjusting each probe independently in correspondence with the fine roughness and inclination of the surface by employing the Z-axis driving mechanism for each probe.

In this embodiment, the specimen is moved in the X-Y directions and the probe is movable only in the Z direction, so that the movement in the X-Y directions does not interfere with the movement in the Z direction, stable scanning thus being practicable.

Figure 12:
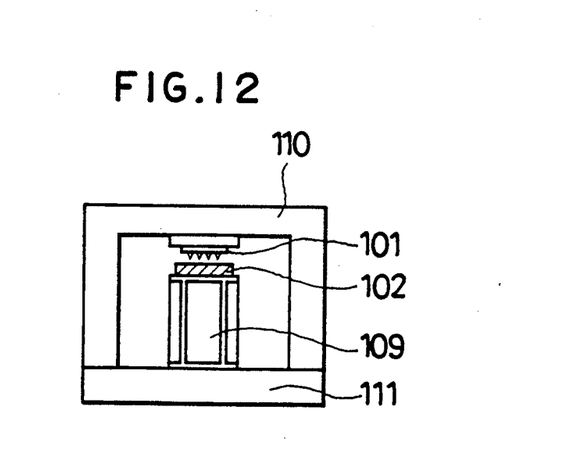

Another construction is shown in a cross-sectional view in FIG. 12, in which a cylindrical piezoelectric element 109 is employed, in place of the aforementioned parallel hinge spring stage 103, as the stage for fine movement of the specimen 102 in the X-Y direction. The probe unit 101 is fixed to a fixing member 110, and opposing to the face of the specimen 102 fixed to the cylindrical piezoelectric element 109.

On the peripheral surface of the cylindrical piezoelectric element 109, the electrode is divided into four parts opposing to the X-Y directions. Application of a reversed polarity voltage to the opposing electrodes makes the cylinder minutely incline relative to the direction of the opposing electrode, moving the specimen 102 finely in the X or Y direction. Application of the same polarity voltage on the quartered electrodes expands or constricts the cylinder in the Z direction, allowing the coarse and fine adjustment in the Z direction, so that the specimen 102 is brought close to the probe unit 101. Although adjusting screws for correction of inclination are not shown in the figure, they may be attached in accordance with necessity.

EMBODIMENT 5

Figure 13:
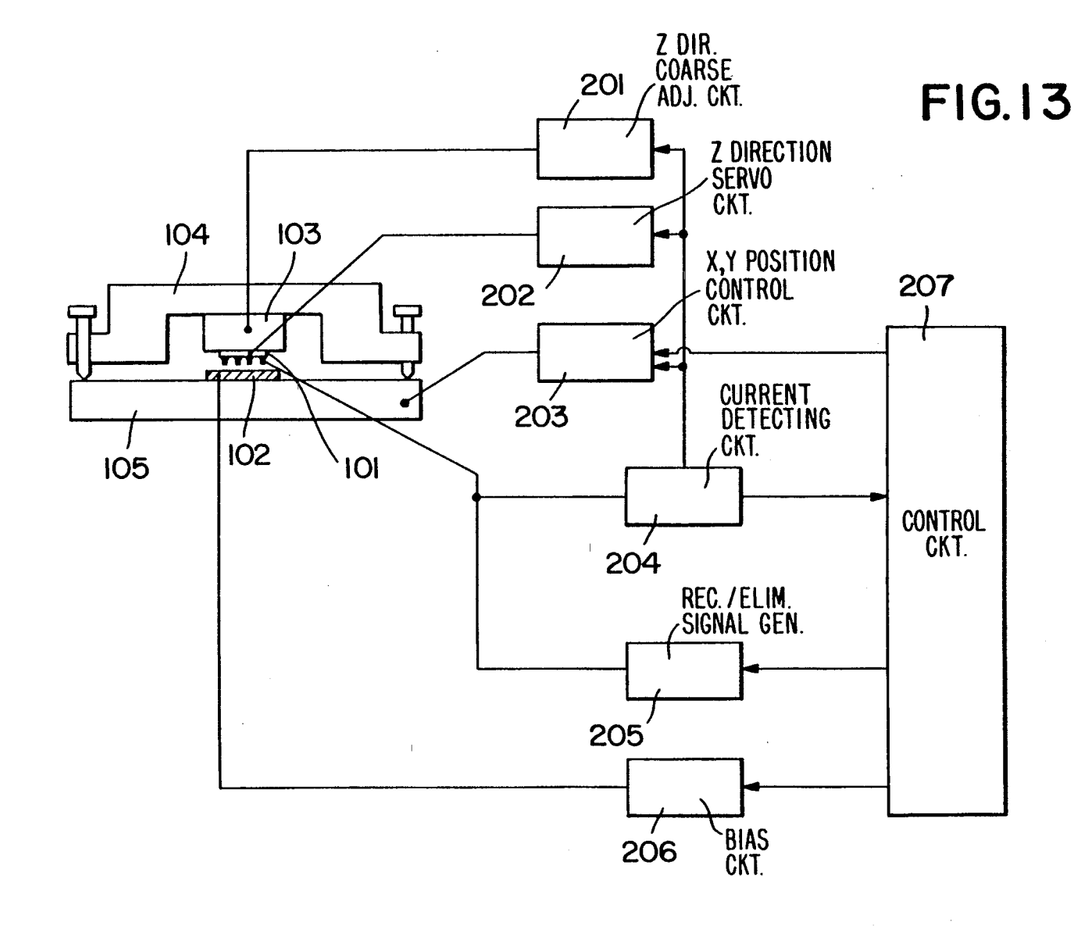
FIG. 13 illustrates a constitution of the recording-reproducing device of the present invention.

FIG. 13 is an illustration of the recording-reproducing method of the present invention. As a recording medium 102, there are used those comprising an electroconductive substrate and a recording layer of a thin film which has an electric memory effect. The thin film may be made of, for example, $\pi$-electron system organic compounds or chalcogen compounds.

The "electric memory effect" referred to previously and known in the art means that there is applied, between the probe and the electroconductive substrate, a voltage exceeding a threshold voltage at which an electroconductivity of the recording medium is changed, so that an electroconductivity of a small region of the recording layer just under the probe is changed and thus recording is performed, and furthermore that such recording state is maintained as long as a voltage (bias voltage) not exceeding the threshold voltage is applied. The reproduction of a record is performed by applying a bias voltage between the probe and the electroconductive substrate to cause an electric current to vary between a recorded region and an unrecorded region of the recording layer.

The elimination of a record is conducted by applying a voltage exceeding the threshold value, at which electroconductivity of the recording layer is changed, between the probe and the electroconductive substrate.

A recording medium, may comprise, as a recording layer, the built-up film of two monomolecular films of squarilium-bis-6-octylazulene according to the Langmuir-Blodgette method formed on an epitaxial growth surface of gold or a cleavage surface of graphite on a plane substrate such as glass and mica.

In using such a recording medium and applying a voltage of, for example, 1 V between the probe and the electroconductive substrate, the current value is $10^{-11}$ A or less and the recording layer is kept at an OFF-state (or a high resistance state).

Then a triangle wave pulse voltage exceeding the threshold voltage and subsequently a voltage of 1 V is applied therebetween, so that a current of about $10^{-7}$ A flows, and the recording layer changes to an ON-state which is recorded.

Furthermore, after a triangle wave pulse voltage of opposite polarity, which pulse voltage exceeds the threshold voltage resulting in the change from the ON-state to the OFF-state, is applied, a voltage of 1 V is applied again, whereby an electric current becomes $10^{-11}$ A or less and the ON-state is changed to the OFF-state to eliminate the record.

The recording-reproducing device of the present invention will be explained by referring to FIG. 13.

First, the recording medium 102 is moved, by adjusting a parallel hinge spring stage 105 in response to signals from an X-Y position controlling circuit 203, so that a desired recording region of the recording medium may be just under the probes of the probe unit 101. A pulse voltage exceeding the threshold voltage resulting in the change of the OFF-state to the ON-state is applied to the recording medium 102 to conduct recording.

On this occasion, a bias voltage of about 0.1 to 1 V is applied to the recording medium 102 by the bias circuit 206 and the probes of the probe unit 101 come close to the recording medium up to such a distance that a tunnel current flows between the probes and the recording medium 102, and the distance is maintained.

More specifically, the probes are allowed to come close to the recording medium up to within the movement scope of a Z axis driving mechanism for each probe of the probe unit 101 by driving a Z direction coarse adjustment piezoelectric device 103 in response to signals from a Z direction coarse adjustment circuit 201, and thereafter each probe is drawn into the tunnel region.

The draw of each probe into the tunnel region is attained by feeding back a tunnel current, which is detected with a tunnel current detecting circuit 204 for each probe, through a Z direction servo circuit 202 of the Z direction driving mechanism for each probe, whereby the distance between each probe and the recording medium is kept constant.

At the time of recording, recording signals are transmitted to a recording/eliminating signal generator 205 from a controlling circuit 207, and a pulse voltage for recording is applied to each probe, whereby recording is performed.

On this occasion, in order to prevent the distance between each probe and the recording medium from varying due to the application of a pulse voltage, a driving voltage of the Z direction driving mechanism of the probe unit is maintained by providing the Z direction servo circuit 202 with a holding circuit.

At the time of reproduction of a record, as during recording, the recording medium 102 is allowed to be moved so that a desired reproduction region thereof may be just under the probes, and a difference in electroconductivity between the tunnel current recorded region and the tunnel current unrecorded region of the recording medium 102 is detected to perform reproduction of the record.

At this time, reproduction signals are reproduced as data by signal-processing the signals in the controlling circuit 207 through the tunnel electric current detecting circuit 204.

Furthermore, at the time of eliminating a record, as during recording, the probes are allowed to be moved on recording bits to be eliminated, and an elimination pulse voltage of a polarity opposite to that upon recording is applied thereto from the recording/eliminating signal generator 205 to perform the elimination of the record. At this time, the distance between each probe and the recording medium is maintained by the holding circuit of the Z direction servo circuit 202.

As explained in the foregoing, the recording/reproducing device of the present invention employing the above-mentioned probe unit can be driven even at a low voltage, is hard to be influenced by temperature change or any changes in the conditions, can be scanned stably and enables recording to be conducted at high density.

The present invention has the advantages as below.

(1) The probe unit of the present invention seldom causes a positional deviation of the probe arising from lengthwise thermal expansion caused by temperature change in operation or from the difference of thermal expansion coefficient between the flexible member and the electrode material, because of the symmetrical structure having the probe in the middle of the bridge-shaped flexible member provided on the substrate and the fixation of both ends of the flexible member.

The probe unit can be formed precisely without warpage or torsion of the beam caused by inner stress in production.

(2) The probe unit of the present invention can be produced at extremely low cost because the material of the substrate is not limited to the conventional silicon substrate but may be commercially available 7059 glass or the like.

(3) The utilization of the piezoelectric effect particularly increases the driving force in the Z direction, and maintains the displacement in the Z direction in the level the same as in a cantilever even with the bridge-shaped structure.

It also raises the resonance frequency, enabling the probe to respond to a higher scanning without influence of external vibration.

We claims:

1. A probe unit comprsing a substrate, a bridge-shaped flexible member formed on the substrate, and a probe provided in contact with the flexible member, said probe unit further comprising a driving means for displacing the probe in a direction perpendicular to a face of the substrate.

2. A probe unit comprising a substrate, a first electrode formed on the substrate, a bridge-shaped flexible member formed on the substrate and insulated by a cavity from the first electrode, and a probe provided in contact with the flexible member, said flexible member being constituted of a laminate comprising a second electrode layer, an insulating layer, and a third electrode layer for applying a voltage to the probe.

3. A probe unit comprising a substrate, a first electrode formed on the substrate, a piezoelectric layer formed on the first electrode, a bridge-shaped flexible member formed on the substrate, and a probe provided in contact with the flexible member, said flexible member being constituted of a laminate comprising a second electrode layer, an insulating layer, and a third electrode layer for applying a voltage to the probe, and said first electrode and the second electrode being in opposition to each other with interposition of the piezoelectric layer.

4. A probe unit comprising a substrate, a bridge-shaped of flexible member formed on the substrate, and a probe provided in contact with the flexible member, said flexible member being constituted of a laminate comprising a beam structure layer, a first electrode layer, a piezoelectric layer, a second electrode, an insulating layer, and a third electrode layer for applying a voltage to the probe.

5. A method for driving a probe unit comprising a substrate, a first electrode formed on the substrate, a bridge-shaped flexible member formed on the substrate and insulated by a cavity from the first electrode, and a probe provided in contact with the flexible member, the flexible member being constituted of a laminate comprising a second electrode layer, an insulating layer, and a third electrode layer for applying a voltage to the probe; said method comprising displacing the probe in a direction perpendicular to the substrate face by an electrostatic force caused by application of voltage between the first electrode and the second electrode layer.

6. A method for driving a probe unit comprising a substrate, a first electrode formed on the substrate, a piezoelectric layer formed on the first electrode, a bridge-shaped flexible member formed on the substrate, and a probe provided in contact with the flexible member, said flexible member being constituted of a laminate comprising a second electrode layer, an insulating layer, and a third electrode layer for applying a voltage to the probe, and said first electrode and the second electrode layer being in opposition to each other with interposition of the piezoelectric layer; said method comprising displacing the probe in a direction perpendicular to the substrate face by piezoelectric effect caused by application of voltage between the first electrode and the second electrode layer.

7. A method for driving a probe unit comprising a substrate, a bridge-shaped flexible member formed on the substrate, and a probe provided in contact with the flexible member, said flexible member being constituted of a laminate comprising a beam structure layer, a first electrode layer, a piezoelectric layer, a second electrode layer, an insulating layer, and a third electrode layer for applying a voltage to the probe; said method comprising displacing the probe in a direction perpendicular to the substrate face by piezoelectric effect caused by application of voltage between the first electrode layer and the second electrode layer.

8. A scanning type of tunnel current detecting device having a probe unit comprising a substrate, a bridge-shaped flexible member provided on the substrate, a probe provided on the flexible member, and a driving means for displacing the probe relative to the substrate; an adjusting means for adjusting the distance between the probe and a specimen to be observed; and a voltage applying means for applying a voltage between the probe and the specimen.

9. The device of claim 8, wherein said device has a second driving means for moving the specimen relative to the probe.

10. The device of claim 8, wherein said probe unit has a first electrode on the substrate, said flexible member is insulated from the first electrode by a cavity and constituted of a laminate comprising a second electrode layer, an insulating layer and a third electrode layer for applying a voltage to the probe.

11. The device of claim 8, wherein said probe unit has a first electrode on the substrate, the first electrode is connected through a piezoelectric layer to the flexible member, and the flexible member is constituted of a laminate comprising a second electrode layer, an insulating layer, and a third electrode layer for applying a voltage to the probe.

12. The device of claim 8, wherein said flexible member is constituted of a laminate comprising a beam structure layer, a first electrode layer, a piezoelectric layer, a second electrode layer, an insulating layer and a third electrode layer for applying a voltage to the probe.

13. A scanning tunnel microscope having:
a probe unit comprising a substrate, a bridge-shaped flexible member provided on the substrate, a probe provided on the flexible member, and a driving means for displacing the probe relative to the substrate;
an adjusting means for adjusting the distance between the probe and a specimen to be observed; and
a voltage applying means for applying a voltage between the probe and the specimen.

14. The scanning tunnel microscope of claim 13, wherein said microscope has a second driving means for moving the specimen relative to the probe.

15. The scanning tunnel microscope of claim 13, wherein said probe unit has a first electrode on the substrate, said flexible member is insulated from the first electrode by a cavity and comprises a laminate comprising a second electrode layer, an insulating layer and a third electrode layer for applying a voltage to the probe.

16. The scanning tunnel microscope of claim 13, wherein said probe unit has a first electrode on the substrate, the first electrode is connected through a piezoelectric layer to the flexible member, and the flexible member comprises a laminate comprising a second electrode layer, an insulating layer, and a third electrode layer for applying a voltage to the probe.

17. The scanning tunnel microscope of claim 13, wherein said flexible member comprises a laminate comprising a beam structure layer, a first electrode layer, a piezoelectric layer, a second electrode layer, an insulating layer and a third electrode layer for applying a voltage the probe.

18. A recording-reproducing device having,
a probe unit comprising a substrate, a bridge-shaped flexible member provided on the substrate, a probe provided on the flexible member, and a driving means for displacing the probe relative to the substrate;
a recording medium;
an adjusting means for adjusting the distance between the probe and the recording medium; and
a voltage applying means for applying a voltage between the probe and the recording medium.

19. The recording-reproducing device of claim 18, wherein said device comprises a second driving means for moving the recording medium relative to the probe.

20. The recording-reproducing device of claim 18, wherein said probe unit comprises a first electrode on the substrate, said flexible member is insulated from the first electrode by a cavity and comprises a laminate comprising a second electrode layer, an insulating layer and a third electrode layer for applying a voltage to the probe.

21. The recording-reproducing device of claim 18, wherein said probe unit has a first electrode on the substrate, the first electrode is connected through a piezoelectric layer to the flexible member, and the flexible member comprises a laminate comprising a second electrode layer, an insulating layer, and a third electrode layer for applying a voltage to the probe.

22. The recording-reproducing device of claim 18, wherein said flexible member comprises a laminate comprising a beam structure layer, a first electrode layer, a piezoelectric layer, a second electrode layer, an insulating layer and a third electrode layer for applying a voltage the probe.

23. The recording-reproducing device of claim 18, wherein said recording medium has an electric memory effect.

24. The recording-reproducing device of claim 18, wherein said recording medium comprises a base electrode and a recording layer provided thereon.

25. The recording-reproducing device of claim 24, wherein said recording medium comprises an organic compound.

26. The recording-reproducing device of claim 24, wherein said recording medium comprises a monomolecular film or a monomolecular built-up film of an organic compound.

27. A recording method employing a probe unit comprising a substrate, a bridge-shaped flexible member provided on the substrate, a probe provided on the flexible member, and a driving means for displacing the probe relative to the substrate, said method comprising the steps of:
   allowing said probe to come close to a recording medium; and
   applying a pulse voltage between said probe and said recording medium.

28. The recording method of claim 27, wherein said recording medium has an electric memory effect.

29. The recording method of claim 27, wherein said recording medium comprises a base electrode and a recording layer provided thereon.

30. The recording method of claim 27, wherein said pulse voltage exceeds a threshold voltage at which the electroconductivity of said recording medium is changed.

31. A recording-reproducing method employing a probe unit comprising a substrate, a bridge-shaped flexible member provided on the substrate, a probe provided on the flexible member, and a driving means for displacing the probe relative to the substrate, said method comprising the steps of:
   allowing said probe to come close to a recording medium;
   applying a pulse voltage between said probe and said recording medium to perform recording; and
   applying a bias voltage therebetween to reproduce a record.

32. The recording-reproducing method of claim 31, wherein said recording medium has an electric memory effect.

33. The recording-reproducing method of claim 31, wherein said recording medium comprises a base electrode and a recording layer provided thereon.

34. The recording-reproducing method of claim 31, wherein said pulse voltage exceeds a threshold voltage at which the electroconductivity of said recording medium is changed.

35. The recording-reproducing method of claim 31, wherein said bias voltage does not exceed a threshold voltage at which the electroconductivity of said recording medium is changed.

36. A recording-reproducing-eliminating method employing a probe unit comprising a substrate, a bridge-shaped flexible member provided on the substrate, a probe provided on the flexible member, and a driving means for displacing the probe relative to the substrate, said method comprising the steps of:
   allowing said probe to come close to a recording medium;
   applying a first pulse voltage between said probe and said recording medium to perform recording;
   applying a bias voltage therebetween to reproduce a record; and
   applying a second pulse voltage therebetween to eliminate a record.

37. The recording-reproducing-eliminating method of claim 36, wherein said recording medium has an electric memory effect.

38. The recording-reproducing-eliminating method of claim 36, wherein said recording medium comprises a base electrode and a recording layer provided thereon.

39. The recording-reproducing-eliminating method of claim 36, wherein said first pulse voltage exceeds a threshold voltage at which the electroconductivity of said recording medium is changed.

40. The recording-reproducing-eliminating method of claim 36, wherein said bias voltage does not exceed a threshold voltage at which the electroconductivity of said recording medium is changed.

41. The recording-reproducing-eliminating method of claim 36, wherein said second pulse voltage exceeds a threshold voltage at which the electroconductivity of said recording medium is changed.

* * * * *

UNITED STATES PATENT AND TRADEMARK OFFICE
CERTIFICATE OF CORRECTION

PATENT NO. : 4,998,016

DATED : March 5, 1991

INVENTOR(S) : HIROYASU NOSE ET AL.

It is certified that error appears in the above-identified patent and that said Letters Patent is hereby corrected as shown below:

COLUMN 2

Line 18, "from" should read --form--.

COLUMN 5

Line 12, "illustrate" should read --illustrates--.
    Line 21, "view an" should read --view of an--.
    Line 23, "principle" should read --principal--.
    Line 54, "etching means" should read --etching by means--.
    Line 64, "Embodiment 1" should read --EMBODIMENT 1--.

COLUMN 6

Line 39, "strengthen" should read --strengthens--.

COLUMN 7

Line 28, "Embodiment 2" should read --EMBODIMENT 2--.

COLUMN 12

Line 52, "claims:" should read --claim:--.

UNITED STATES PATENT AND TRADEMARK OFFICE
CERTIFICATE OF CORRECTION

PATENT NO. : 4,998,016

DATED : March 5, 1991

INVENTOR(S) : HIROYASU NOSE ET AL.

It is certified that error appears in the above-identified patent and that said Letters Patent is hereby corrected as shown below:

COLUMN 13

Line 11, "of" should be deleted.

Signed and Sealed this

Twenty-ninth Day of December, 1992

Attest:

DOUGLAS B. COMER

*Attesting Officer*    *Acting Commissioner of Patents and Trademarks*